(12) United States Patent
Wilding et al.

(10) Patent No.: US 10,858,496 B2
(45) Date of Patent: Dec. 8, 2020

(54) DURABLE RETROREFLECTIVE ELEMENTS WITH A BLEND OF BEADS

(71) Applicant: 3M INNOVATIVE PROPERTIES COMPANY, St. Paul, MN (US)

(72) Inventors: Matthew D. Wilding, White Bear Lake, MN (US); Stephen L. Lieder, Wyoming, MN (US); Eugene H. Carlson, Apple Valley, MN (US); Kenton D. Budd, Woodbury, MN (US); Joseph D. Engebretson, St. Croix Falls, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 83 days.

(21) Appl. No.: 15/759,124

(22) PCT Filed: Sep. 6, 2016

(86) PCT No.: PCT/US2016/050395
§ 371 (c)(1),
(2) Date: Mar. 9, 2018

(87) PCT Pub. No.: WO2017/044418
PCT Pub. Date: Mar. 16, 2017

(65) Prior Publication Data
US 2018/0291175 A1 Oct. 11, 2018

Related U.S. Application Data

(60) Provisional application No. 62/217,520, filed on Sep. 11, 2015.

(51) Int. Cl.
*C08K 3/22* (2006.01)
*C03C 12/02* (2006.01)
(Continued)

(52) U.S. Cl.
CPC .............. *C08K 3/22* (2013.01); *C03C 12/02* (2013.01); *C08K 3/013* (2018.01); *C08K 3/40* (2013.01);
(Continued)

(58) Field of Classification Search
CPC ............... C03C 12/02; C09D 123/14; C08K 2003/2241; C08K 3/013; C08K 3/40;
(Continued)

(56) References Cited

U.S. PATENT DOCUMENTS 3,175,935 A 3/1965 Vanstrum
3,252,376 A * 5/1966 De Vries .............. G02B 5/128
359/539

(Continued)

FOREIGN PATENT DOCUMENTS

CA 1006486 3/1977
CA 2481854 3/2006

(Continued)

OTHER PUBLICATIONS

Highway Safety Marking Spheres, Potters, Ibaraki-ken, Japan, [retrieved from the internet on Apr. 20, 2018], URL<http://pgj.co.jp/en/inquiry.html>, pp. 02.

(Continued)

*Primary Examiner* — Cheng Yuan Huang
(74) *Attorney, Agent, or Firm* — Carlos M. Téllez; Daniel J. Iden; 3M Innovative Properties Company

(57) ABSTRACT

The disclosed retroreflective element includes a polymeric core that is loaded with a plurality of first beads and second beads distributed at the perimeter of the core. The first beads are different than the second beads. Because of the beads in the core, the retroreflective element remains useful for returning light even after portions of the core begins to wear away. Further, when the retroreflective elements get wet, (Continued)

water will settle to the bottom of the perimeter of the core. Therefore, using the second beads with a refractive index suited for wet conditions, while the first beads have a refractive index suited for dry conditions allows the retroreflective element to be useful in both wet and dry conditions even while the retroreflective element wears during use.

16 Claims, 1 Drawing Sheet

(51) Int. Cl.
    *C08K 3/013*     (2018.01)
    *C08K 3/40*     (2006.01)
    *E01F 9/524*     (2016.01)
    *G02B 5/128*     (2006.01)
    *C08L 23/14*     (2006.01)
    *C09D 123/14*     (2006.01)
    *C08L 51/06*     (2006.01)
    *C08L 23/08*     (2006.01)

(52) U.S. Cl.
    CPC ........... *C08L 23/0853* (2013.01); *C08L 23/14* (2013.01); *C08L 51/06* (2013.01); *C09D 123/14* (2013.01); *E01F 9/524* (2016.02); *G02B 5/128* (2013.01); *C08K 2003/2241* (2013.01); *C08L 2205/18* (2013.01)

(58) Field of Classification Search
    CPC ... C08K 3/22; C08L 2205/18; C08L 23/0853; C08L 51/06; C08L 23/14; E01F 9/524; G02B 5/128
    See application file for complete search history.

(56) References Cited

U.S. PATENT DOCUMENTS

| | | | |
|---|---|---|---|
| 3,254,563 A | 6/1966 | De Vries | |
| 3,418,896 A | 12/1968 | Rideout | |
| 3,493,403 A | 2/1970 | Tung | |
| 3,709,706 A | 1/1973 | Sowman | |
| 3,758,193 A * | 9/1973 | Tung | G02B 5/128 |
| | | | 359/359 |
| 3,836,226 A | 9/1974 | Cechetini | |
| 3,894,791 A | 7/1975 | Eigenmann | |
| 3,935,158 A | 1/1976 | Watanabe | |
| 4,564,556 A | 1/1986 | Lange | |
| 4,988,541 A | 1/1991 | Hedblom | |
| 5,750,191 A | 5/1998 | Hachey | |
| 5,774,265 A | 6/1998 | Mathers | |
| 5,777,791 A | 7/1998 | Hedblom | |
| 5,942,280 A | 8/1999 | Mathers | |
| 6,245,700 B1 | 7/2001 | Budd | |
| 7,513,941 B2 | 4/2009 | Frey | |
| 7,524,779 B2 | 4/2009 | Frey | |
| 7,820,083 B2 | 10/2010 | Bjorklund | |
| 8,591,044 B2 | 11/2013 | Budd | |
| 8,591,045 B2 | 11/2013 | Budd | |
| 2003/0051807 A1 | 3/2003 | Yamaguchi | |
| 2003/0090800 A1 | 5/2003 | Humpal | |
| 2005/0001342 A1 | 1/2005 | Durant | |
| 2005/0100709 A1 | 5/2005 | Bescup | |
| 2005/0158461 A1 | 7/2005 | Bescup | |
| 2006/0062965 A1 | 3/2006 | Durant | |
| 2007/0110960 A1 | 5/2007 | Frey | |
| 2008/0041103 A1 | 2/2008 | Kramlich | |
| 2008/0280034 A1 | 11/2008 | Mathis | |
| 2009/0181213 A1 | 6/2009 | Durant | |
| 2009/0202298 A1 | 8/2009 | Bjorklund | |
| 2010/0055374 A1 | 3/2010 | Greer | |
| 2010/0221419 A1 | 9/2010 | Frey | |
| 2013/0215510 A1 | 8/2013 | Gelfant | |

FOREIGN PATENT DOCUMENTS

| | | | |
|---|---|---|---|
| CA | 2701269 | 10/2010 | |
| CN | 1379862 | 11/2002 | |
| CN | 101434823 | 5/2009 | |
| DE | 2522710 | 1/1976 | |
| EP | 0322671 | 7/1989 | |
| EP | 0237315 | 9/1991 | |
| GB | 1037265 | 7/1966 | |
| GB | 2164762 | 3/1986 | |
| GB | 2389615 | 12/2003 | |
| GB | 2402694 | 12/2004 | |
| JP | 2001-048586 | 2/2001 | |
| NL | 7300593 | 7/1973 | |
| WO | WO 1997-028470 | 8/1997 | |
| WO | WO 1997-028471 | 8/1997 | |
| WO | WO 1997-038835 | 10/1997 | |
| WO | WO 1998-047830 | 10/1998 | |
| WO | WO 1999-104620 | 3/1999 | |
| WO | WO 2000-020481 | 4/2000 | |
| WO | WO 2003-038191 | 5/2003 | |
| WO | WO 2005-073468 | 8/2005 | |
| WO | WO 2007-092635 | 8/2007 | |
| WO | WO-2007092635 A1 * | 8/2007 | ............. E01F 9/524 |
| WO | WO 2008-123862 | 10/2008 | |
| WO | WO 2009-142859 | 11/2009 | |
| WO | WO 2011-022021 | 2/2011 | |
| WO | WO 2011-022022 | 2/2011 | |
| WO | WO 01/29587 | 4/2011 | |
| WO | WO 2013-043884 | 3/2013 | |

OTHER PUBLICATIONS

International Search report for PCT international Application No. PCT/US2016/050395 dated Nov. 23, 2016, 5 pages.

* cited by examiner

DURABLE RETROREFLECTIVE ELEMENTS WITH A BLEND OF BEADS

CROSS REFERENCE TO RELATED APPLICATIONS

This application is a national stage filing under 35 U.S.C. 371 of PCT/US2016/050395, filed Sep. 6, 2016, which claims the benefit of Provisional Application No. 62/217,520, filed Sep. 11, 2015, the disclosures of which are incorporated by reference in their entirety herein.

TECHNICAL FIELD

The present disclosure relates to a retroreflective element with a plurality of first beads distributed throughout the composite core and a plurality of second beads at the perimeter of the composite core.

BACKGROUND

Pavement or road markings (e.g., paints, tapes, and individually mounted articles) guide and direct motorists and pedestrians traveling along roadways and paths. Pavement or road markings can be used on, for example, roads, highways, parking lots, and recreational trails. Typically, pavement markings form stripes, bars, and markings for the delineation of lanes, crosswalks, parking spaces, symbols, legends, and the like. Paint was a preferred pavement marking for many years. Retroreflective liquid pavement markings typically include retroreflective elements. Retroreflective liquid pavement marking offer significant advantages over paint, such as increased visibility, retroreflectance, improved durability, and temporary and/or removable marking options. Such retroreflective elements are described in, for example, U.S. Pat. Nos. 5,750,191; 5,774,265; 5,942,280; 7,513,941; 8,591,044; 8,591,045; and U.S. Patent Publication Nos. 2005/0100709 and 2005/0158461, all of which are incorporated herein in their entirety. Commercially available retroreflective elements include, for example, All Weather Elements made by 3M Company of St. Paul, Minn. Typically, a retroreflective element includes a core adjacent to numerous glass or glass ceramic beads that are adhered to the outermost surface of core by a binder.

As is described in, for example, U.S. Patent Publication No. 2005/0100709, the retroreflective elements are applied onto or into liquid roadway or pavement markings or compositions such that at least a portion of most of the retroreflective elements extends above or out of the roadway or pavement marking. Light that is transmitted by a light source (e.g., a streetlight or a car's headlights) is incident on the retroreflective liquid pavement marking (and the retroreflective elements therein) is retroreflected by the retroreflective elements in the roadway marking. Specifically, the glass or glass ceramic beads transmit incident light back toward the incoming light source.

Pavement or road markings are subject to continuous wear and exposure to the elements as well as road chemicals. Consequently, there is a need for the materials used in pavement or road marking compositions that provide durability and retained reflectivity once applied to a surface.

SUMMARY

The disclosed retroreflective element includes a polymeric core that is loaded with a plurality of first beads and second beads distributed at the perimeter of the core. The first beads are different than the second beads. Because of the beads in the core, the retroreflective element remains useful for returning light even after portions of the core begins to wear away. Further, when the retroreflective elements get wet, water will settle to the bottom of the perimeter of the core. Therefore, using the second beads with a refractive index suited for wet conditions, while the first beads have a refractive index suited for dry conditions allows the retroreflective element to be useful in both wet and dry conditions even while the retroreflective element wears during use.

In one embodiment, the reflective element comprises a composite core comprising a polymer and a plurality of first beads having a first refractive index distributed throughout the polymer and a plurality of second beads having a second refractive index that is different than the first refractive index, wherein the second beads are at a perimeter of the composite core. In one embodiment, the polymer is a thermoplastic or thermoset acrylic, polycarbonate, polyurethane, polyolefin, polyester, fluoropolymer, polyvinyl chloride or its copolymers, acid olefin copolymer such as ethylene acrylic acid or ethylene methacrylic acid, ionic copolymer, or mixtures thereof. In one embodiment, the polymer has a hardness of greater than a Shore D 10. In one embodiment, the polymer has a hardness of greater than a Shore D 36 and less than Shore D 68. In one embodiment, the first beads are a glass or glass ceramic bead. In one embodiment, the first refractive index ranges from 1.5 to 2.6. In one embodiment, the first bead comprises from 5-65% volume of the composite core. In one embodiment, the first bead comprises from 20-35% volume of the composite core. In one embodiment, the second beads are a glass or glass ceramic bead. In one embodiment, the second refractive index ranges from 1.5-2.6. In one embodiment, the difference in refractive index between the first refractive index and the second refractive index is at least 0.25. In one embodiment, the difference in refractive index between the first refractive index and the second refractive index is at least 0.5. In one embodiment, the difference in refractive index between the first refractive index and the second refractive index is less than 1.5. In one embodiment, the second beads are at the entire perimeter of the composite core. In one embodiment, the second beads are fixed to the perimeter of the composite core by one of the polymer, a softening material, or an adhesive. In one embodiment, the retroreflective element is secured to a substrate by an adhesive, paint, resin.

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

The term "retroreflective" as used herein refers to the attribute of reflecting an obliquely incident radiation ray in a direction generally antiparallel to its incident direction such that it returns to the radiation source or the vicinity thereof.

Figure 1:
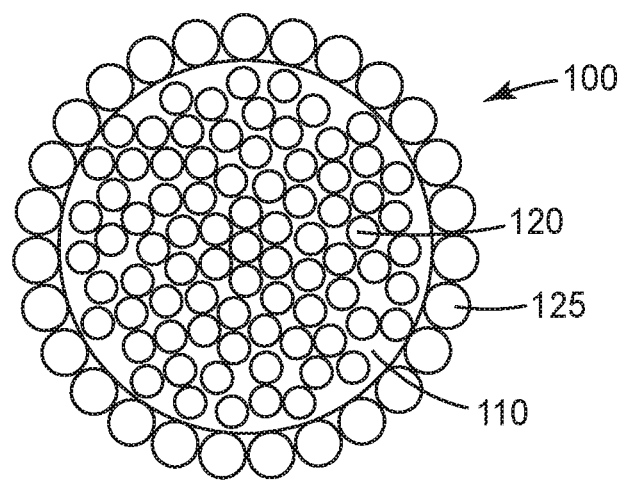
FIG. 1 is a side sectional view of one embodiment of a reflective element.

In the embodiment shown in FIG. 1, the retroreflective element 100 comprises a core 110 with first beads 120 distributed throughout. Because the core 110 is a blend of polymer and first beads 120, the core may be referred to as a "composite core." In one embodiment, the first beads 120 are distributed uniformly throughout the core 110. In one embodiment, 5-65 volume % of the volume of the core comprises beads. Including too high of a bead loading will impact the mechanical properties of the core.

In one embodiment, the beads are 20-35 volume % of the core. In one embodiment, polymer entirely surrounds each first bead 120 within the core 120.

Second beads 125 are disposed around at least a portion of a perimeter of the core 110. The core 110 is a three-dimensional body, and therefore "perimeter" means at least a portion of the external surface of the core 110. In one embodiment, the first beads 120 are disposed around the entire perimeter of the core 110.

The first beads 120 have a first refractive index, and the second beads 125 have a second refractive index, that is different than the first refractive index.

In some embodiments, the first beads 120 have refractive indices of between about 1.5 and about 2.6. In some embodiments, the first beads 120 have refractive indices of between about 1.8 and about 2.3. In some embodiments, the first beads 120 have a mean refractive index of between about 1.8 and about 2.3. In some embodiments, the first beads 120 have a refractive index of between about 1.9 and about 2.2. In some embodiments, the first beads 120 have a refractive index of about 1.9. In some embodiments, the first beads 120 have a refractive index of about 2.2. In particular, beads having a refractive index ranging between 1.5 and 1.9 perform well in dry conditions.

In some embodiments, the second beads 125 have refractive indices of between about 1.5 and about 2.6. In some embodiments, the second beads 125 have refractive indices of between about 1.8 and about 2.3. In some embodiments, the second beads 125 have a mean refractive index of between about 1.8 and about 2.3. In some embodiments, the second beads 125 have a refractive index of between about 1.9 and about 2.2. In some embodiments, the second beads 125 have a refractive index of about 1.9. In some embodiments, the second beads 125 have a refractive index of about 2.2. In particular, beads having a refractive index ranging between 1.85 and 2.45 perform well at night and/or wet conditions.

Figure 2:
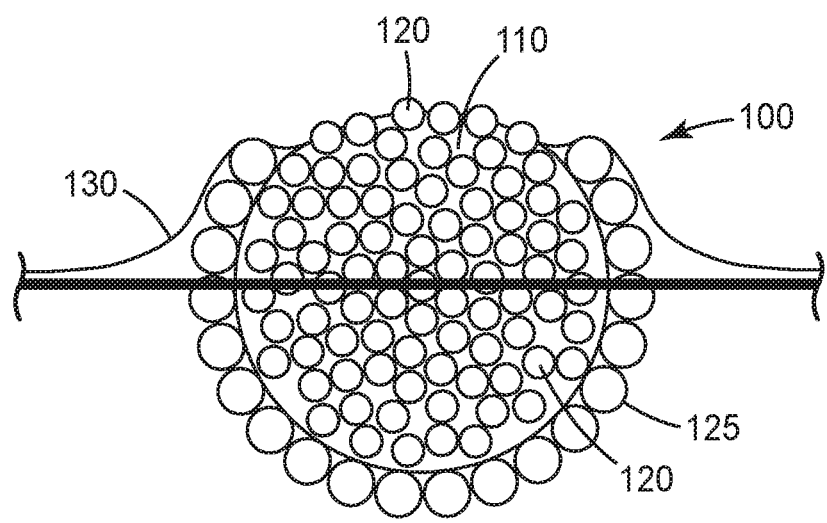
FIG. 2 is a side sectional view of the reflective element in FIG. 1 after extensive use and shown in wet conditions.

During wet conditions, water 130 will tend to settle at the base of the retroreflective element 100, such as shown in FIG. 2. Using second beads 125 with a refractive index ranging greater than 2.3 will allow for these second beads 125 to perform well when wet. When the retroreflective element 100 wears away, such as shown in FIG. 2, first beads 120 will still remain exposed and allow for the core to still function at returning light even when the core begins to wear. In one embodiment, using first beads 120 with a refractive index ranging from 1.5 to 1.9 allows for the overall retroreflective element to perform well in both dry and wet conditions. Using a combination of both bead types enhances overall retroreflective element performance.

In one embodiment, the different between the refractive index of the first bead and second bead is at least 0.25. In one embodiment, the difference in refractive index of the first bead to the second bead is at least 0.3. In one embodiment, the difference in refractive index of the first bead to the second bead is at least 0.5. In one embodiment, the difference between the refractive index of the first bead and the second bead is less than 1.5.

In one embodiment, the beads 125 at the perimeter of the core 110 are of the same average size as the first beads 120 dispersed throughout the core 110. In one embodiment, the second beads 125 at the perimeter of the core 110 are of a different average size from the first beads 120 dispersed throughout the core 110. For example, second beads 125 may be larger or smaller than first beads 120. In one embodiment, the first beads 120 have the same general shape as the second beads 125. In one embodiment, the first beads 120 and second beads 125 have a different shape. In one embodiment, the first beads 120 have of a different composition than second beads 125.

Suitable polymers for use in the retroreflective element may be thermoplastic or thermoset materials. The polymer should be durable, tough, and hard. For example, typically the polymer has a hardness greater than the hardness of tire treads. In one embodiment, the polymer has a Shore D hardness of at least 10. In one embodiment, the ionic copolymer has a Shore D hardness between 36 and 68. In one embodiment, the ionic copolymer has a Shore D hardness of 66.

The materials should be resistant to ultraviolet light, abrasion, salt, water, oil, chemicals and have heat deflection or softening temperature greater than the temperature typically encountered in roadway surfaces. For example, suitable materials include acrylics, polycarbonates, polyurethanes, polyolefins, polyesters, fluoropolymers, polyvinyl chloride and its copolymers, acid olefin copolymers such as ethylene acrylic acid, ethylene methacrylic acid, acid olefin copolymers neutralized with a base "ionomer" or "ionic copolymer", and mixtures thereof.

In one embodiment, the polymer is an ionic copolymer. The term "ionic copolymer" as used herein refers to materials that include a fraction of ionized units covalently bonded to a polymer backbone as pendant group moieties. In one embodiment, the ionic copolymer includes no more than 15 mole percent of ionized units covalently bonded to a polymer backbone as pendant group moieties. In some embodiments, the ionic copolymer is a thermoplastic, which allows for desirable processing using an extruder as compared to thermoset or highly crosslinked materials, like epoxy. In one embodiment, the ionic copolymer has a Shore D hardness between 36 and 68. In one embodiment, the ionic copolymer has a Shore D hardness of 66.

Some exemplary ionic copolymers include those commercially available under the trade designation SURLYN by DuPont de Nemours. In some embodiments, the ionic copolymer is an ionically cross-linked ethylene methacrylic acid copolymer.

Without wishing to be bound by theory, it is believed that the ionic copolymer of the core forms an ionic bond to beads or other additives, like the pigments, thereby increasing the strength and durability of the core. The ion groups can form bonds or crosslinks in the mixture of the composite core to contribute to toughness, hardness of the material. In particular, the ion groups will bond to the glass material of the glass beads. Further, without wishing to be bound by theory, it is believed that the ionic copolymer of the core can form an ionic bond to the underlying substrate (i.e., tape, paint), thereby increasing adhesion of core to the underlying substrate.

Other materials can be included within the retroreflective element. These other materials can be added to the polymer during manufacturing the composite core, or may be added to the polymer prior to manufacturing the composite core. Examples of other materials include pigments, UV stabilizers, heat stabilizers, antioxidants, processing aids, and skid-resistant particles, for examples.

Stabilizing agent improve resistance to UV light or heat resistance to the retroreflective element. Exemplary stabilizing agents include, for example, hindered amine light stabilizers (HALS), phosphonate heat stabilizers, benzophenones, and zinc compounds. Stabilizing agents may be present at levels up to about 5 wt %. Some embodiments include one or more plasticizers. In some embodiments, extender resins, often halogenated polymers such as chlorinated paraffins, but also hydrocarbon resins or polystyrenes, are included with the ionic copolymer precursor ingredients, and are miscible with, or form a single phase with, the ionic copolymer.

The core or the retroreflective element of the present disclosure can be any desired color, including, for example, white or yellow. The core or the retroreflective element can be colored in any way known in the art, including, for example, inclusion of one or more of organic pigments, inorganic pigments and whitening agents.

Examples of useful organic pigments include halogenated copper phthalocyanines, aniline Blacks, anthraquinone blacks, benzimidazolones, azo condensations, arylamides, diarylides, disazo condensations, isoindolinones, isoindolines, quinophthalones, anthrapyrimidines, flavanthrones, pyrazolone oranges, perinone oranges, beta-naphthols, BON arylamides, quinacridones, perylenes, anthraquinones, dibromanthrones, pyranthrones, diketopyrrolo-pyrrole pigments (DPP), dioxazine violets, copper and copper-free phthalocyanines, Indanthrones, and the like.

Examples of useful inorganic pigments include titanium dioxide, zinc oxide, zinc sulphide, lithopone, antimony oxide, barium sulfate, carbon black, graphite, black iron oxide, black micaceous iron oxide, brown iron oxides, metal complex browns, lead chromate, cadmium yellow, yellow oxides, bismuth vanadate, lead molybdate, cadmium red, red iron oxide, prussian blue, ultramarine, cobalt blue, chrome green (Brunswick green), chromium oxide, hydrated chromium oxide, organic metal complexes, lake dye pigments and the like.

Exemplary whitening agents include, for example, $TiO_2$, barium sulfate, and zinc oxide. In embodiments including $TiO_2$, the composition may include, for example, from about 0.1 or about 0.5 or about 5 wt. % to about 5 or about 10 or about 15 wt. % $TiO_2$. In some embodiments, the compositions comprise a whitening agent or a yellow organic pigment. In some embodiments, the composition comprises from about 0.5 wt. % to about 2.5 wt. % of an organic yellow pigment.

The core may optionally include one or more fillers. Useful fillers are typically solids that are non-reactive with the other components of the compositions of the application. Useful fillers include, for example, crushed quartz, ground or light calcium carbonate (with or without a surface-treatment such as a fatty acid, resin acid, cationic surfactant, or anionic surfactant), magnesium carbonate, sulfates such as barium sulfate, alumina, metals in powder form (e.g., aluminum, zinc and iron), bentonite, kaolin clay, talc, glass particles (e.g., frit or fibers), glass beads, metal oxide particles, silica particles, ceramic microspheres, hollow polymeric microspheres (such as those available under the trade designation EXPANCEL 551 DE from Akzo Nobel, Duluth, Ga.), hollow glass microspheres (such as those available under the trade designation K37 from 3M Co., St Paul, Minn.), carbonates, metal oxides, silicates (e.g. talc, asbestos, clays, mica), sulfates, silicon dioxide and aluminum trihydrate.

The filler can also comprise conductive particles (see, for example, U.S. Patent Application Pub. No. 2003/0051807, incorporated herein in its entirety by reference) such as carbon particles or metal particles of silver, copper, nickel, gold, tin, zinc, platinum, palladium, iron, tungsten, molybdenum, solder or the like, or particles prepared by covering the surface of these particles with a conductive coating of a metal or the like. It is also possible to use non-conductive particles of a polymer such as polyethylene, polystyrene, phenol resin, epoxy resin, acryl resin or benzoguanamine resin, or glass beads, silica, graphite or a ceramic, whose surfaces have been covered with a conductive coating of a metal or the like.

In some embodiments, the polymer, first bead, and optional ingredients are mixed to form a relatively homogeneous mixture, wherein fillers and other materials insoluble in the polymer are dispersed randomly three-dimensionally throughout the polymer. An extruder is suitable for this purpose.

Skid-resistant particles, if included, can improve dynamic friction between the retroreflective element and a vehicle tire or walker. The skid-resistant particles can be, for example, ceramics such as quartz or aluminum oxide or similar abrasive material. Skid-resistant particles can be included in the polymer of the core or can be applied to the outer surface of the retroreflective element.

In one embodiment, an adhesive is included to bond the second bead to the core. In one embodiment, an adhesive in included to bond the retroreflective element to a tape or other substrate, such as a roadway surface. Some exemplary adhesive compositions include pressure sensitive adhesives, thermoplastic resin-containing compositions, heat-activated adhesives (i.e., hot melt adhesives), thermoset adhesives, contact adhesives, acrylic adhesives, epoxy adhesives, urethane adhesives, and combinations thereof.

Any existing retroreflective element glass or glass ceramic beads can be used in the retroreflective elements. This includes, for example, those glass or glass ceramic beads described in U.S. Pat. Nos. 3,493,403; 3,709,706; 4,564,556; and 6,245,700, all of which are incorporated herein in their entirety.

In some embodiments, the glass or glass ceramic beads have mean or average diameters of 30-200 microns. In some embodiments, the glass or glass ceramic beads have mean or average diameters of 50-100 microns. In some embodiments, the glass or glass ceramic beads have mean or average diameters of 60-90 microns. In some embodiment, the first bead and second bead can be of similar sizes. In some embodiment, the first beads and second beads are of different sizes. If processing the material in an extruder, the beads loaded in the polymer should be small enough to easily pass through the extruder. In one embodiment, these first beads should have an average diameters less than 250 microns. In one embodiment, these first beads have an average diameter between 60-90.

Some exemplary glass compositions include those described, for example, in U.S. Pat. Nos. 6,245,700 and 7,524,779, both of which are incorporated herein in their entirety. In some embodiments, the glass or glass ceramic beads include at least one or more of, for example, a lanthanide series oxide, aluminum oxide, $TiO_2$, BaO, $SiO_2$, or $ZrO_2$.

In some embodiments, the resulting retroreflective elements have a mean or average diameter of between about 100 microns and about 2000 microns.

In some embodiments, the retroreflective elements are essentially spherical, as described in, for example, U.S. Pat. Nos. 5,942,280 and 7,513,941, both of which are incorporated herein in their entirety. In some embodiments, the retroreflective elements are non-spherical, as described in, for example, U.S. Pat. No. 5,774,265 and WO 2013/043884, incorporated by reference herein in its entirety.

The retroreflective elements can have any desired topography. For example, the elements can be roughly spherical overall, with an outer surface of closely packed glass or glass ceramic beads. In some embodiments, the glass or glass ceramic beads are spherical. In one embodiment, the retroreflective element can include protrusions extending from the core with cavities between adjacent protrusions, such as disclosed in WO 2013/043884.

The retroreflective elements described herein can be made, manufactured, or formed by any of several methods. Typically, the composite core is formed, and then the second beads are applied to the composite core.

In one embodiment, the composite core is formed by forming small pieces of the polymer, such as disclosed in U.S. Pat. No. 5,750,191, the disclose of which is herein incorporated by reference. The first beads are mixed in the polymer prior to extrusion.

In one embodiment, the second beads are secured to the composite core by softening and securing directly to the polymer of the composite core. In one embodiment, a softening agent is applied to the composite core and the second beads are secured to the softening agent. In one embodiment, an adhesive is applied to the composite core and the second beads are secured to the adhesive. In one embodiment, the second beads are secured to the composite core by adding the composite core to a mobile bed of second beads, such as described in U.S. Pat. No. 5,750,191.

The disclosed retroreflective elements can be used with liquid pavement marking. Any known liquid pavement marking can be used with the retroreflective elements described herein. Some exemplary commercially available roadway marking liquid pavement markings capable of use with the retroreflective elements include, for example, Liquid Pavement Marking Series 5000, available from 3M Company, St. Paul, Minn.; HPS-2, available from Ennis-Flint, Thomasville, N.C.; and LS90, available from Epoplex, Maple Shade, N.J. In some embodiments, the liquid pavement marking includes a colorant. In some embodiments, the liquid pavement marking is white or yellow.

Any known process for including or applying retroreflective elements to a liquid pavement marking composition may be used to include or apply the retroreflective elements described herein to a roadway marking or liquid pavement marking. For example, the methods described in the following patents may be used: U.S. Pat. Nos. 3,935,158 and 5,774,265, both of which are incorporated in their entirety herein.

The disclosed retroreflective elements can be used with any substrate to make a pavement marking tape. For example, single or multilayers of materials comprising a resilient polymeric base sheet, a binder layer, optical elements, and optionally a scrim and/or adhesive layer are commonly used to make pavement marking tapes, as described in U.S. Pat. Nos. 4,988,541 and 5,777,791.

Although specific embodiments have been shown and described herein, it is understood that these embodiments are merely illustrative of the many possible specific arrangements that can be devised in application of the principles of the invention. Numerous and varied other arrangements can be devised in accordance with these principles by those of skill in the art without departing from the spirit and scope of the invention. The scope of the present invention should not be limited to the structures described in this application, but only by the structures described by the language of the claims and the equivalents of those structures.

EXAMPLES

Objects and advantages of the present application are further illustrated by the following examples. The particular materials and amounts thereof recited in the examples, as well as other conditions and details, should not be construed to unduly limit the invention. Those of skill in the art will recognize that other parameters, materials and equipment may be used. All parts, percentages and ratios herein are by weight unless otherwise specified.

Test Methods

Taber Abrasion:

Taber abrasion was tested following the procedure described in ASTM D4060-14, "Standard Test Method for Abrasion Resistance of Organic Coatings by the Taber Abraser". About 50 g of Comparative Composite Core A was poured onto a silicone release liner to form a flat disc and then cured at 121° C. for 30 minutes. Composite Cores 1-3 were pressed into 20 cm diameter flat discs of approximately 3 mm thickness using a platen press (Phi model PW-220H) heated to 176.7° C. The discs were then cut into 10 cm square samples and a central 6 mm hole was drilled in them for testing on a Taber Abraser (model, 5130 obtained from Teledyne Taber, North Tonawanda, N.Y.). Samples were tested according for a total of 2000 cycles using CS-17 wheels. Results are reported as a Taber Abraser wear index, wherein the lower the index, the more abrasion-resistant the material is.

Dry Retroreflectivity:

Dry retroreflectivity was measured following the procedure described in ASTM E1710-11, "Standard Test Method for Measurement of Retroreflective Pavement Marking Materials with CEN-Prescribed Geometry Using a Portable Retroreflectometer". Dry retroreflectivity was measured initially (0 revolutions), after 1,000 revolutions and after 10,000 revolutions.

Wet Retroreflectivity:

Wet retroreflectivity was measured following the procedure described in ASTM E2177-11, "Standard Test Method for Measuring the Coefficient of Retroreflected Luminance (RL) of Pavement Markings in a Standard Condition of Wetness". Wet retroreflectivity was measured initially (0 revolutions), after 1,000 revolutions and after 10,000 revolutions.

Materials

| Trade Designation | Material Description | Vendor Name/Trade Name |
|---|---|---|
| SURLYN 9120 | EMAA ionomer | DuPont USA, Wilmington, DE |

-continued

| Trade Designation | Material Description | Vendor Name/Trade Name |
|---|---|---|
| RP323M | Polypropylene copolymer | Lyondell Basell Industries, Houston, TX |
| ELVAX 150W | Ethylene Vinyl Acetate copolymer | DuPont |
| EXXELOR PO 1020 | Maleic anhydride grafted PP (MAPP) | Exxon Mobil, Irving, TX |
| TI-PURE R104 | Titanium Dioxide | DuPont |
| IRIODIN 9119 WR POLAR WHITE | Pearlescent Pigment | EMD Performance Materials, Philadelphia, PA |
| GLACIER FROST WHITE 9S130D | Pearlescent Pigment | BASF, Florham Park, NJ |
| GLASS BEADS R.I. 1.9 | Glass Beads, 50-100 micron diameter, refractive index 1.9 | Prepared as described below. |
| 3M ALL WEATHER ELEMENTS SERIES 90 WHITE | Beads having a refractive index of about 1.9 and 2.4 | 3M Company, St. Paul MN |
| BYK-P 4102 | Dispersion Aid | BYK USA Inc., Wallingford, CT |

Preparation of Beads
Preparation of Glass Beads Having R.I. 1.9

Glass beads having a refractive index of 1.9 were isolated from 3M Scotchlite™ Reflective Material—8912 Silver Fabric by heating the reflective material to 600° C. for 30 minutes in a muffle furnace, removing and cooling to room temperature, and sieving out the glass beads.

Microcrystalline Beads Having R.I. 1.9

Bead having a refractive index of 1.9 were isolated from 3M All Weather Elements, Series 90, white by first separating the elements by refractive index of the surface beads. Separating the elements by refractive index of the surface beads was done by shining a light held near the eye onto a monolayer of dry elements and then hand selecting the elements which appear brighter. The brighter elements contain beads of 1.9 refractive index. Beads with 1.9 refractive index were isolated by heating the separated elements containing 1.9 refractive index beads to 600° C. for 30 minutes in a muffle furnace, removing and cooling to room temperature, and sieving out the glass beads.

Microcrystalline Beads Having R.I. 2.4

Beads having a refractive index of 2.4 were isolated from 3M All Weather Elements, Series 90, white by first separating the elements by refractive index of the surface beads. Separating the elements by refractive index of the surface beads was done by shining a light held near the eye onto a monolayer of dry elements and then hand selecting the elements which appear less bright. The less bright elements contain beads of 2.4 refractive index. Beads with 2.4 refractive index were isolated by heating the separated elements containing 2.4 refractive index beads to 600° C. for 30 minutes in a muffle furnace, removing and cooling to room temperature, and sieving out the glass beads.

Preparation of Cores
Comparative Core A

Comparative sand core elements were prepared as generally described in Example 1 of U.S. Patent Publication No. 2005/0100709 (Bescup et al) and are hereinafter referred to as Comparative Core A.

Composite Cores 1-3

Composite Cores 1-3 were prepared by mixing the ingredients listed in Table 1, below, in a twin screw extruder and pelletized in a pelletizer. Each one of Composite Cores 1-3 had a final diameter of between about 1.5 mm and about 2 mm diameter and approximately between about 2 mm and 3 mm long.

TABLE 1

| Ingredients | Core 1 | Core 2 | Core 3 |
|---|---|---|---|
| EMAA ionomer | 28.65% | 27.65% | 0 |
| Polypropylene copolymer | 0 | 0 | 17.65% |
| Ethylene Vinyl Acetate copolymer | 0 | 0 | 1.24% |
| Maleic anhydride grafted PP (MAPP) | 0 | 0 | 1.59% |
| Titanium Dioxide | 0 | 19.62% | 0 |
| Pearlescent Pigment | 16.68% | 0 | 0 |
| Pearlescent Pigment | 0 | 0 | 12.99% |
| Glass Beads, 50-100 micron diameter | 54.66% | 52.74% | 66.20% |
| Dispersion Aid | 0 | 0 | 0.33% |

Comparative Core A and Composite Cores 1-3 were submitted to the Taber abrasion test described above. Results are reported in Table 2, below.

TABLE 2

| Composite Cores | Taber Wear Index |
|---|---|
| Composite Core 1 | 67 |
| Composite Core 2 | 66 |
| Composite Core 3 | 114 |
| Comparative Core A | 270 |

EXAMPLES

Comparative Example A

Comparative Reflective Elements comprising Comparative Core A and a polyurethane binder were prepared as generally described in Example 1 of U.S. Patent Publication No. 2005/0100709 (Bescup et al), except that the microcrystalline beads having a refractive index of 2.4 were used. The comparative reflective elements are hereinafter referred to as Comparative Example A.

Comparative Example B

Comparative Example B was prepared as described in Comparative Example A except that microcrystalline beads having a refractive index of 1.9 were used.

Examples 1-4

Retroreflective Elements of Examples 1-4 were prepared by coating Composite Cores 1-3 with microcrystalline ceramic beads prepared as described above. Composite Cores 1-3 were added to a fluidized bath containing a surplus of microcrystalline beads at a temperature of approximately 350° C. After about 5 seconds, the coated composite cores were sieved out of the bead bath, cooled in a room temperature water bath, then drained and dried. Composition of Examples 1-4 is summarized in Table 3, below.

TABLE 3

| Examples | Composite Core | Refractive Index of microcrystalline beads |
|---|---|---|
| Example 1 | Composite Core 1 | 1.9 |
| Example 2 | Composite Core 2 | 1.9 |
| Example 3 | Composite Core 3 | 1.9 |
| Example 4 | Composite Core 1 | 2.4 |

Retroreflective Pavement Marking 1-4 and Comparative Retroreflective Pavement Markings A-B Retroreflective Pavement Marking Compositions were prepared as following: six 30.5 cm wide by 122 cm long aluminum panels were prepared by coating with a 10 cm wide strip of liquid pavement marking composition (obtained under the trade designation "LPM 1500" from 3M Company) down the length of each panel using a 1.016 mm (40 mil) 8-way coater. In a first panel, retroreflective elements of Example 1 were manually deposited over the uncured liquid pavement marking composition, for a total coating weight of 328 grams of retroreflective elements per square meter of liquid pavement marking composition, forming Retroreflective Pavement Marking 1. The procedure was repeated using retroreflective elements of Examples 2-4 and of Comparative Examples A-B, resulting in, respectively, Retroreflective Pavement Markings 2-4 and Comparative Retroreflective Pavement Markings A-B. The coated panels were allowed to cure overnight at room temperature.

The coated panels were then placed in a vehicle wear simulator as generally described in U.S. Pat. No. 5,777,791 (Hedblom), the disclosure of which is incorporated herein by reference in its entirety. The wear simulator consisted of a 3.3 m diameter circular track with two automobile wheels and tires that travelled around the circular track via a central motor, gear box, and rotating steel support arms. The wheels were disposed in a horizontal plane and made contact with the vertical track surface. A counter tallied the number of revolutions. For the present test, a monolayer of sand granules of approximately 1-2 mm diameter available from Badger Mining Corporation were adhered to the tire treads with a thin (1 mm thick) coating of adhesive (obtained under the trade designation "3M SPA60" from 3M Company) to simulate the erosive materials typically encountered on road surfaces. The wheels were rotated at 100 RPM around the track with a tire pressure of about 206.8 kPa (30 psi). Dry retroreflectivity and wet retroreflectivity were measured initially (0 revolutions), after 1,000 revolutions and after 10,000 revolutions. Percent of retained dried retroreflectivity was calculated by dividing the dry retroreflectivity results at either 1,000 or 10,000 revolutions by the initial dry retroreflectivity and multiplying it by 100. Results are reported in Table 4, below, wherein N/A means "not applicable" and N/M means "not measured".

TABLE 4

| Retroreflective Pavement Markings | Number of revolutions | Dry retroreflectivity (mcd/m$^2$/lux) | Retained dry retroreflectivity (%) | Wet retroreflectivity (mcd/m$^2$/lux) |
|---|---|---|---|---|
| Retroreflective Pavement Marking 1 | 0 | 2624 | N/A | N/M |
| | 1000 | 1350 | 51.4% | 55 |
| | 10000 | 869 | 33.1% | 70 |
| Retroreflective Pavement Marking 2 | 0 | 2136 | N/A | N/M |
| | 1000 | 843 | 39.5% | 71 |
| | 10000 | 546 | 25.6% | 95 |
| Retroreflective Pavement Marking 3 | 0 | 2236 | N/A | N/M |
| | 1000 | 373 | 16.7% | 177 |
| | 10000 | 163 | 7.3% | 163 |
| Retroreflective Pavement Marking 4 | 0 | 257 | N/A | N/M |
| | 1000 | 165 | 64.2% | 216 |
| | 10000 | 129 | 50.2% | 151 |
| Comparative Retroreflective Pavement Marking A | 0 | 249 | N/A | N/M |
| | 1000 | 122 | 49.0% | 222 |
| | 10000 | 78 | 31.3% | 108 |
| Comparative Retroreflective Pavement Marking B | 0 | 1961 | N/A | N/M |
| | 1000 | 550 | 28.0% | 95 |
| | 10000 | 240 | 12.2% | 131 |

What is claimed is:

1. A reflective element comprising: a core consisting of a composite core
   wherein the composite core comprising a polymer and a plurality of first beads having a first refractive index distributed throughout the polymer;
   a plurality of second beads having a second refractive index that is different from the first refractive index, wherein the plurality of second beads are at a perimeter of the composite core,
   wherein the plurality of the first beads are entirely distributed throughout the composite core wherein the plurality of first beads are glass or glass ceramic beads and wherein the reflective element is essentially spherical.

2. The reflective element of claim 1, wherein the polymer is a thermoplastic or thermoset acrylic, polycarbonate, polyurethane, polyolefin, polyester, fluoropolymer, polyvinyl chloride and its copolymers, acid olefin copolymer such as ethylene acrylic acid or ethylene methacrylic acid, ionic copolymer, or mixtures thereof.

3. The reflective element of claim 1, wherein the polymer has a hardness of greater than a Shore D 10.

4. The reflective element of claim 1, wherein the polymer has a hardness of greater than a Shore D 36 and less than Shore D 68.

5. The reflective element of claim 1, wherein the first refractive index ranges from 1.5 to 2.6.

6. The reflective element of claim 1, wherein the plurality of first beads comprise from 5-65% volume of the composite core.

7. The reflective element of claim 1, wherein the plurality of first beads comprise from 20-35% volume of the composite core.

8. The reflective element of claim 1, wherein the plurality of second beads are glass or glass ceramic beads.

9. The reflective element of claim 1, wherein the second refractive index ranges from 1.5-2.6.

10. The reflective element of claim 1, wherein the difference in refractive index between the first refractive index and the second refractive index is at least 0.25.

11. The reflective element of claim 1, wherein the difference in refractive index between the first refractive index and the second refractive index is at least 0.5.

12. The reflective element of claim 1, wherein the difference in refractive index between the first refractive index and the second refractive index is less than 1.5.

13. The reflective element of claim 1, wherein the plurality of second beads are at the entire perimeter of the composite core.

14. The reflective element of claim 1, wherein the plurality of second beads are fixed to the perimeter of the composite core by one of the polymer, a softening material, or an adhesive.

15. The reflective element of claim 1, wherein the retroreflective element is secured to a substrate by an adhesive, paint, resin.

16. The reflective element of claim 1, wherein the composite core is a sphere.

* * * * *